United States Patent
Katz et al.

[11] 3,741,018
[45] June 26, 1973

[54] FLUIDIC ANGULAR RATE SENSOR

[75] Inventors: Silas Katz, Silver Spring; Edgar G. Hastie, Rockville, both of Md.

[73] Assignee: The United States of America as represented by the Secretary of the Army

[22] Filed: Nov. 23, 1971

[21] Appl. No.: 201,282

[52] U.S. Cl. ................... 73/506, 73/521, 137/826
[51] Int. Cl. ............................................ G01p 3/26
[58] Field of Search ...................... 73/505, 506, 521, 73/523; 137/81.5, 826, 830

[56] References Cited
UNITED STATES PATENTS

| | | | |
|---|---|---|---|
| 3,503,479 | 3/1970 | Canova | 192/103 |
| 2,982,902 | 5/1961 | Gates et al. | 318/481 |
| 3,656,353 | 4/1972 | Bell | 73/521 |
| 3,176,094 | 3/1965 | Ipsen | 73/521 |
| 3,136,326 | 6/1964 | Bryant | 73/521 |

*Primary Examiner*—Herbert Goldstein
*Attorney*—Harry M. Saragovitz

[57] ABSTRACT

A fluidic angular rate sensor is disclosed comprising a rotatable disc which preferably has a plurality of elongated apertures therethrough of a finite length, the rotatable disc being adapted to be rotated about its axis at a velocity which is proportional to an angular velocity to be measured. A fluid input means or hole having a given discharge area is associated with the rotating disc and serves to sequentially apply a fluid signal into each aperture whereat the signal is entrained while the disc rotates. A fluid collector means having a given collector area is disposed in substantial alignment with the fluid input means and is associated with the rotating disc, the collector sequentially receiving from each aperture a portion of the applied fluid signal. This portion has a value which is proportional to the product of the instantaneous velocity of the fluid signal entrained in the aperture and the instantaneous exposed collector area of the collector means, which collector area varies as the disc rotates. Sensing means are provided to operate upon the received signal so as to derive an output signal which preferably comprises the average of the received signal, the output signal being indicative of the angular velocity of the disc.

5 Claims, 7 Drawing Figures

PATENTED JUN 26 1973 3,741,018
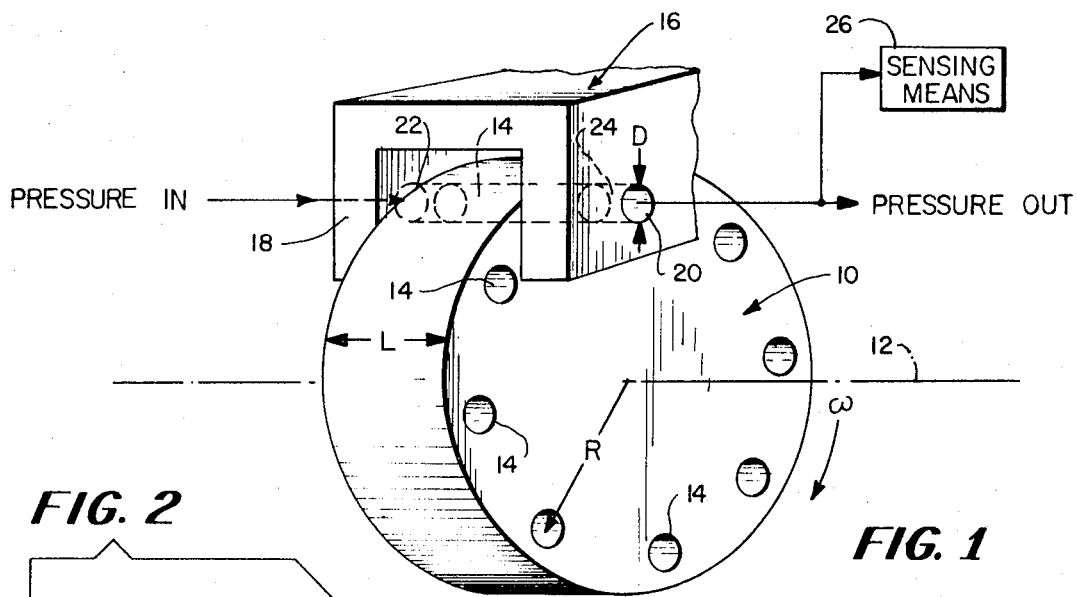
FIG. 1
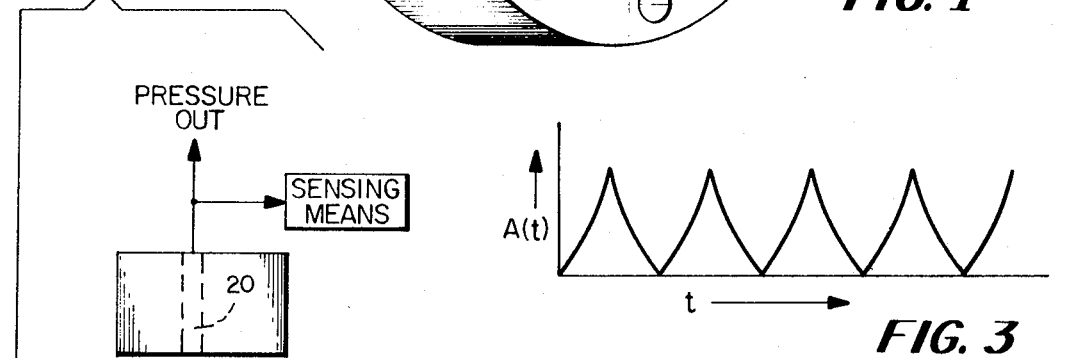
FIG. 2
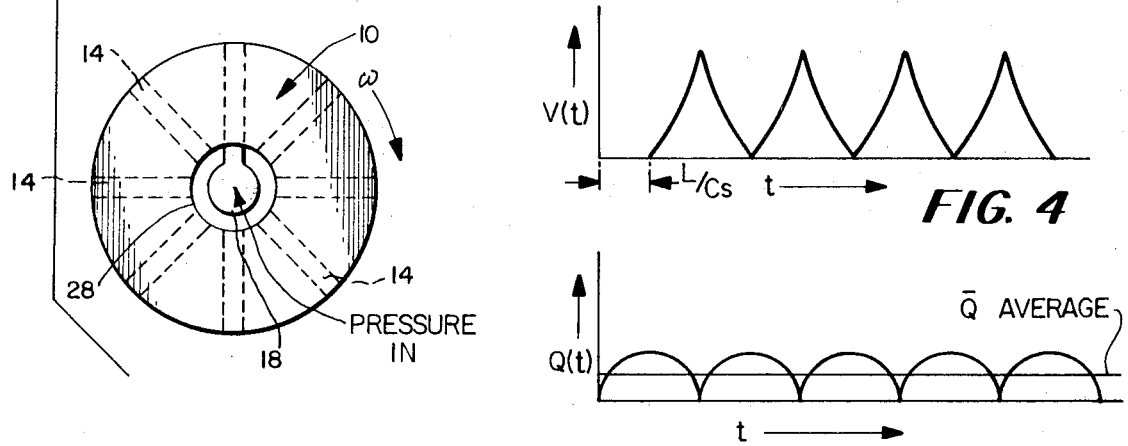
FIG. 3
FIG. 4
FIG. 5
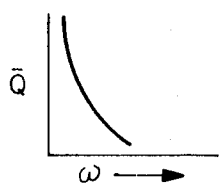
FIG. 6a
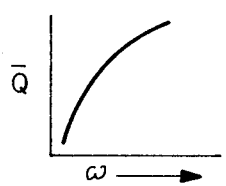
FIG. 6b
INVENTORS
SILAS KATZ
EDGAR G. HASTIE
BY Harry M. Saragovitz
Edward J. Kelly
Herbert Berl
Saul Elbaum
ATTORNEY

3,741,018

FLUIDIC ANGULAR RATE SENSOR

The invention described herein may be manufactured, used and licensed by or for the United States Government for governmental purposes without the payment to us of any royalty thereon.

BACKGROUND OF THE INVENTION

This invention generally relates to the fluidic arts and particularly concerns the provision of a fluidic angular rate sensor.

The need for angular rate or velocity sensors in association with the detection and control of rotating machinery and devices has long been recognized in the art and has fostered a proliferation of angular rate sensors of various types. For example, mechanical regulators have been developed such as "governor valves" which utilize fly weights, springs, valve arrangements and the like in association with a rotating device to limit its speed. Electromechanical angular rate sensors have likewise been developed, as have electronic sensors which utilize electromagnetic principles to generate a plurality of pulses having a frequency proportional to the angular rate of the rotating device. Each of these prior art devices of the type discussed present one or more disadvantages particularly as concerns longevity, accuracy of measurement, and delay time between detection of an angular rate deviation and generation of a control signal.

Partially in response to these disadvantages, fluidic velocity sensors and regulators were developed in the art, such typical fluidic sensors utilizing a fluid amplifier as a control switch, as well as sensing means which provided to the fluid amplifier a signal indicative of the angular velocity of a particular driven element. Typically, such prior art fluidic angular rate sensors operated to generate an output signal having a frequency proportional to the angular rate of rotation of the driven element, such output signal being produced by periodically blocking a flow of fluid between an inlet nozzle and an outlet collector, for example. Fluidic elements of this variety usually required complicated additional components so as to process the frequency signal so produced and convert the frequency signal into an analogue signal for use in subsequent control of the rotating device. Other fluidic angular rate sensors generally exhibit rather complex construction and require a relatively large amount of input power.

SUMMARY OF THE INVENTION

Accordingly, a need still exists in this art for an angular rate sensor of the fluidic variety above-discussed which does not possess the inherent disadvantages of typical prior art constructions. It is the primary object of the instant invention to provide such an improved fluidic angular rate sensor.

It is a further object of the instant invention to provide a fluidic angular rate sensor having relatively simple construction.

It is still another object of the instant invention to provide a fluidic angular rate sensor which can directly produce a usable output signal without the requirement of additional frequency to analogue conversion components.

Yet another objective of the instant invention concerns the provision of a fluidic angular rate sensor which is operable with only a relatively small amount of input power and which possesses an unusually high sensitivity so as to accurately measure and detect the angular rate of a rotating device.

These objects as well as others which will become apparent as the description proceeds are implemented by the novel fluidic angular rate sensor of the instant invention which, in its preferred embodiment, will be seen to include a rotatable disc element which is adapted to be rotatably driven about its axis at a velocity which is proportional to an angular velocity to be measured. In this respect, the rotatable disc element is contemplated to be mechanically coupled, for example, to an external driven device. The disc element is provided with at least one and, preferably, a plurality of elongated apertures therethrough, each aperture being of a finite length.

A fluid input means or nozzle having a given discharge area is associated with the disc element and serves to apply a fluid signal, preferably at constant pressure, sequentially into each aperture of the disc whereat the signal is entrained throughout the rotation of the disc. A fluid collector means having a given collector area is disposed in substantial alignment with the fluid input means and is likewise associated with the disc. During rotation of the disc, the fluid collector means serves to sequentially receive a portion of the applied fluid signal from each aperture.

Importantly, and at the heart of the instant invention, the value of the portion of the applied fluid signal received by the collector means is proportional to the product of the instantaneous velocity of the fluid signal entrained in each aperture and the instantaneous exposed collector area of the fluid collector means. In this respect, it should be appreciated that the exposed collector area is that portion of the total collector area that is "seen" by the aperture through the disc at any point of time. In operation, when the fluid signal leaves the aperture in the disc and is received by the fluid collector, there is a relative displacement between the aperture in the disc and the fluid collector itself, which displacement increases with wheel speed and thus, the fluid signal "captured" or collected by the fluid collector changes as the speed of the disc changes.

The received signal is operated upon by a sensing means which, in the preferred embodiment, serves to take an average of the received signal so as to derive an output signal which is indicative of the angular velocity of the rotating disc.

BRIEF DESCRIPTION OF THE DRAWINGS

The invention will be better understood and further features and advantages thereof will become apparent from the following detailed description of a preferred inventive embodiment, such description referring to the appended single sheet of drawing, wherein:

FIG. 1 is a perspective illustration, partially broken away for clarity, of a first embodiment of the novel angular rate sensor of the instant invention;

FIG. 2 is an elevational plan view of another embodiment of the fluidic angular rate sensor of the instant invention;

FIG. 3 is a graphical illustration of the change in exposed collector area as a function of time;

FIG. 4 is a graphical illustration of the velocity of a fluid signal entrained in the apertures of the rotating disc of the instant invention, as a function of time;

FIG. 5 is an illustration of the signal received by the fluid collector means of the instant invention, such signal being a product of the function depicted in FIGS. 3 and 4; and FIGS. 6a and 6b are graphical illustrations of the change in the average signal of FIG. 5 as a function of increasing angular velocity of the rotating disc with the fluid inlet means and the fluid collector means aligned, and with the fluid inlet means and the fluid collector means slightly out of alignment, respectively.

DETAILED DESCRIPTION OF A PREFERRED INVENTIVE EMBODIMENT

Referring to the drawings, attention is initially directed to FIG. 1 thereof, wherein a perspective illustration of a first embodiment of the novel fluidic angular rate sensor of the instant invention is depicted. The sensor will be seen to comprise a rotatable disc element generally designated by reference numeral 10 which is adapted to be rotatably driven about its axis 12 at a velocity proportional to an angular velocity to be measured. In this respect, the rotatable disc element 10 could be mechanically coupled, such as by gearing arrangements or the like, to some external rotating device to provide an angular rate $\omega$ of the disc itself. The disc will be seen to have a substantial thickness L and includes at least one and preferably a plurality of elongated apertures or channels 14 therethrough at a radial distance r from the axis of rotation 12. It should further be appreciated that the elongated apertures, in the embodiment of FIG. 1, have a finite length L, which length is substantially greater than is the diameter D of the aperture openings.

A fixed signal bracket element generally designated by reference numeral 16 carries a fluid input means 18 and a fluid collector means 20 disposed in substantial alignment with one another and in a position so as to communicate with the plurality of apertures 14 through the rotating disc 10. The fluid input means 18 as well as the fluid collector means 20 may simply comprise apertures or holes through the signal bracket 16 and the actual alignment between these apertures may be adjusted or varied, if desired, so as to achieve certain characteristic signal results as will be discussed in detail herinbelow.

The fluid input means 18 is adapted to be coupled to an external source of pressure, and preferably a constant fluidic pressure source throughout operation of the novel device. The fluid input means 18 has a given discharge area 22 which is preferably substantially equal to the opening area of the apertures 14 through the rotating disc 10. The fluid input means 18 applies a fluid signal sequentially into each aperture 14 of the disc 10 while the disc rotates and this fluid signal is entrained within the apertures 14 due to the finite length of the apertures.

The fluid collector means 20 likewise includes a given collector area 24 which is preferably substantially equal to the discharge area of the elongated apertures 14. The fluid collector means serves to receive from each aperture 14 during rotation of the disc 10 a portion of the fluid signal applied to the apertures by the fluid input means 18. A specific relationship exists between the portion of the fluid signal received by the collector means 20 and the rotational velocity of the disc element 10 as will be developed below.

Specifically, it should again be kept in mind that as the fluid signal passes through and is entrained in a respective aperture 14 of the rotating disc 10, the disc 10 continues to turn and thus, a relative displacement exists between the particuar aperture 14 and the hole 20 in the signal bracket 16 defining the fluid collector means. This relative displacement in alignment between the aperture 14 and the fluid collector means 20 at the time that the fluid collector means 20 receives or captures the entrained fluid signal increases with speed of the rotating disc 10 and thus, the amount of fluid captured by the fluid collector means 20 varies as the speed of the disc 10 varies.

Stated in other words, since the elongated apertures 14 have a substantial finite length, a time interval exists between application of a fluid signal to the aperture 14 and passage of the fluid signal through the aperture itself to the discharge point. During this time interval, the disc 10 continues to turn and thus effects a relative displacement between the aperture 14 and the fluid collector means. This relative displacement results in a changed "exposed" collector area at the fluid collector means 20, which "exposed" collector area can be defined as that portion of the overall given collector are 24 which is "seen" by the aperture 14 in the disc 10 when the fluid signal leaves the aperture 14. This change in "exposed" collector area results in a change in the amount of the fluid signal that is captured by the fluid collector means as the speed of the disc 10 changes.

From the above discussion, it is therefore apparent that the signal received by the fluid collector means 20 is a function of the product of the above-discussed instantaneous exposed collector area of the fluid collector means, and the instantaneous velocity of the fluid signal entrained in the aperture 14. Mathematically expressed as a function of time, the signal received or captured, $Q(t)$ by the fluid collector means bears the following relationship:

$$Q(t) = A(t)V(t)$$

where $A(t)$ is the instantaneous exposed collector area as a function of time, and wherein $V(t)$ is the instantaneous velocity of the fluid signal entrained in the aperture as a function of time.

At this juncture, attention is directed to FIGS. 3 and 4 of the drawings wherein the time-varying function $A(t)$ of the exposed collector area and the time varying function $V(t)$ of the fluid signal velocity is illustrated. In this respect, it should be noted that velocity function of FIG. 4 is delayed in time by an amount $L/C_s$, wherein L is the thickness of the disc 10 and wherein $C_s$ is the effective propagation velocity of the fluid pulse as it passes through an aperture 14 in the disc 10. The apertures of channels therefore define a fluidic delay line.

Since, as above-described, the signal received by the fluid collector means 20 is the product of the exposed area function of FIG. 3 and the velocity function of FIG. 4, the resultant wave shape of such signal is as appears in FIG. 5 of the appended drawings. This resultant signal is that which appears as the output pressure from the fluid collector means 20 during rotation of the disc 10.

The novel invention contemplates the provision of a sensing means 26 of any suitable and conventional construction which serves to derive an output signal from the signal received or captured by the fluid collector means 20 which is indicative of the angular velocity of the rotating disc 10. In the preferred inventive embodiment, such sensing means 26 is contemplated to operate, in a conventional fashion, upon the received signal so as to provide an output signal which has a value which is the average Q of the received signal as is again depicted in FIG. 5 of the appended drawings. This average signal is representative of the angular velocity of the rotating disc and variations in angular rate of the disc 10 serve to vary the value of the average signal Q.

Specifically, and referring now to FIG. 6a of the appended drawings, if the fluid input means 18 is in effective alignment with the fluid collector means 20, there will be seen that the average signal Q decreases as the rotational or angular velocity ω of the disc 10 increases. Alternatively, if the fluid input means 18 is somewhat out of alignment with the fluid collector means 20, then the average output signal Q will serve to increase as the angular rate ω of the rotating disc 10 increases. In each instance, however, and for purposes again of definition, the fluid input means 18 and the fluid collector means 20 are considered to be in "substantial alignment" with one another.

The embodiment of the instant invention depicted in FIG. 1 of the appended drawings is such that the elongated apertures 14 through the disc element 10 has an axis which is parallel to the axis of rotation 12 of the disc with the fluid input means 18 and the fluid collector means 20 being respectively disposed to either side of the disc element 10. This construction can be modified within the teachings of the instant invention so as to provide alternative embodiments such as is depicted in FIG. 2 of the appended drawings.

Referring now to FIG. 2, like elements illustrated therein will be seen to be designated by the same reference numerals as that utilized in describing the components of the inventive embodiment of FIG. 1. Thus, a similar disc element 10 is provided having a plurality of apertures 14 therethrough. However, in this instance, apertures 14 are disposed through the disc element 10 in a radial direction. The fluid input means 18 and the fluid collector means 20 are disposed along a radial axis of the disc 10 and, in the preferred inventive embodiment, the fluid input means 18 is substantially disposed at the rotational center of the disc 10, which center comprises the center of an enlarged bore 28 through the disc 10. The fluid collector means 20 is contemplated to be preferably disposed at the outer periphery of the disc element 10. It should be apparent, however, that the respective placements of the fluid input means 18 and the fluid collector means 20 could be reversed, if desired.

It should further be appreciated that in each of the embodiments of the instant invention depicted in FIGS. 1 and 2, the particular shapes of the apertures and holes are not critical to operation of the instant invention and thus, even though the shapes have been indicated in the appended drawings as being round, square hole shapes and the like could also be effectively utilized.

It should now be apparent that the objects initially set forth at the outset of this specification have been successfully achieved. It should further be understood that the invention is not limited to the exact details of construction shown and described herein for other obvious modifications will occur to persons skill in the art. ACCORDINGLY,

What is claimed is:
1. A fluidic angular rate sensor comprising:
a rotatable disc element having at least one elongated channel therethrough of a finite length L, said channel defining a fluidic delay line, said disc element being adapted to be rotated about its axis at a velocity proportional to an angular velocity to be measured;
fluid input means having a given discharge area associated with said disc element for applying a fluid signal pulse sequentially into each channel whereat said signal pulse is entrained while said disc element rotates, said signal pulse being propagated along said channel at an average propagation velocity $C_s$;
fluid collector means having a given collector area disposed in substantial alignment with said fluid input means and associated with said disc element for sequentially receiving from each channel during rotation of said disc element a portion of the applied fluid signal after a time delay $L/C_s$, said received signal having a pressure which is proportional to the product of the instantaneous velocity $V(t)$ of the fluid signal entrained in said channel and the instantaneous exposed collector area $A(t)$ of said fluid collector means; and
pressure sensing means coupled to said fluid collector means for deriving an output signal from the received signal which is indicative of the angular velocity of said disc element.

2. A fluidic angular rate sensor as defined in claim 1, wherein said output signal from said sensing means has a value which is the average of the received signal.

3. A fluidic angular rate sensor as defined in claim 1, wherein said elongated channels through said disc element have an axis parallel to the axis of rotation of said disc element, said fluid input means and said fluid collector means being respectively disposed to either side of said disc element.

4. A fluidic angular rate sensor as defined in claim 1, wherein said elongated channels are disposed through said disc element in a radial direction, said fluid input means and said fluid collector means being disposed along a radial axis of said disc element with one of said fluid input means and said fluid collector means being substantially disposed at the rotational center of said disc element and with the other of said fluid input means and said fluid collector means being disposed at the outer periphery of said disc element.

5. A fluidic angular rate sensor comprising:
a rotatable disc element having at least one elongated channel therethrough of a finite length L, said channel defining a fluidic delay line, said disc element being adapted to be rotated about its axis at a velocity proportional to an angular velocity to be measured;
fluid input means having a given discharge area associated with said disc element for applying a fluid signal pulse sequentially into each channel whereat said signal pulse is entrained while said disc element rotates, said signal pulse being propagated along said channel at an average propagation velocity C;
fluid collector means having a given collector area disposed in a slightly misaligned relationship with said fluid input means and associated with said disc element for sequentially receiving from each channel during rotation of said disc element a portion of the applied fluid signal after a time delay L/C, said received signal having a pressure which is proportional to the product of the instantaneous velocity V($t$) of the fluid signal entrained in said channel and the instantaneous exposed collector area A($t$) of the fluid signal entrained in said channel and the instantaneous exposed collector area of said fluid collector means; and pressure sensing means coupled to said fluid collector means for deriving an output signal from the received signal which is indicative of the angular velocity of said disc element.

* * * * *